United States Patent [19]

Lazzari

[11] Patent Number: 4,809,103
[45] Date of Patent: Feb. 28, 1989

[54] HEAD SLIDER WITH AN INTEGRATED FLAT MAGNETIC HEAD

[75] Inventor: Jean-Pierre Lazzari, Corenc, France

[73] Assignee: Commissariat a l'Energie Atomique, Corenc, France

[21] Appl. No.: 63,793

[22] Filed: Jun. 22, 1987

Related U.S. Application Data

[63] Continuation-in-part of Ser. No. 696,516, Jan. 30, 1985, abandoned.

[30] Foreign Application Priority Data

Feb. 3, 1984 [FR] France .................................. 84 01882

[51] Int. Cl.[4] ........................ G11B 5/60; G11B 15/64; G11B 17/32; G11B 21/20
[52] U.S. Cl. ..................................... 360/103; 360/110; 360/126; 360/104
[58] Field of Search ............... 360/103, 104, 110, 113, 360/121–122, 125, 126, 123; 29/603; 346/74.2

[56] References Cited

U.S. PATENT DOCUMENTS

| | | | |
|---|---|---|---|
| 3,975,771 | 8/1976 | Lazzari | 360/122 |
| 4,030,189 | 6/1977 | Lazzari | 360/121 |
| 4,219,853 | 8/1980 | Albert et al. | 360/121 |
| 4,321,641 | 3/1982 | Lee | 360/126 |
| 4,414,554 | 11/1983 | Springer | 360/110 |
| 4,429,337 | 1/1984 | de Wilde | 360/123 X |
| 4,435,900 | 3/1984 | de Wilde | 360/113 |
| 4,438,471 | 3/1984 | Oshiki et al. | 360/125 |
| 4,503,440 | 3/1985 | Springer | 360/110 |

FOREIGN PATENT DOCUMENTS

| | | | |
|---|---|---|---|
| 0152328 | 9/1985 | European Pat. Off. | 360/110 |
| 53-69623 | 6/1978 | Japan | 360/110 |
| 55-132520 | 10/1980 | Japan | 360/110 |
| 55-135325 | 10/1980 | Japan | 360/110 |
| 56-74812 | 6/1981 | Japan | 360/110 |
| 56-148713 | 11/1981 | Japan | 360/110 |
| 57-98120 | 6/1982 | Japan | 360/110 |
| 58-118016 | 7/1983 | Japan | 360/110 |
| 58-118017 | 7/1983 | Japan | 360/110 |
| 58-208922 | 12/1983 | Japan | 360/103 |
| 58-208925 | 12/1983 | Japan | 360/103 |
| 59-168968 | 9/1984 | Japan | 360/110 |
| 2130425 | 5/1984 | United Kingdom | 360/110 |

OTHER PUBLICATIONS

IBM Tech. Disclo. Bull., vol. 23, No. 12, May 1981, pp. 5556–5557, "Magnetic Head Arm Assembly", by W. L. Wright.

*Primary Examiner*—John H. Wolff
*Assistant Examiner*—Alfonso Garcia
*Attorney, Agent, or Firm*—Oblon, Fisher, Spivak, McClelland & Maier

[57] ABSTRACT

An integrated structure is provided for magnetic recording which utilizes a silicon wafer having two parallel faces which are crystal planes of orientation 100. One face is designed so as to constitute a displacement plane when used as a read and write device in a magnetic support. The magnetic head has a horizontal structure and is integrated into the silicon wafer in the face having the displacement plane. An electronic circuit is integrated in the silicon wafer in one of the two faces and connections are provided between the magnetic head and the electronic circuit.

1 Claim, 2 Drawing Sheets

HEAD SLIDER WITH AN INTEGRATED FLAT MAGNETIC HEAD

BACKGROUND OF THE INVENTION

The present invention relates to a read-write device with an integrated structure for magnetic recording. It is used in the production of disk memories for computers.

DISCUSSION OF BACKGROUND

A disk memory comprises a support covered with a magnetic film in which the information can be written or read by a magnetic head. In operation, the magnetic disk rotates at high speed and, during its rotation, it entrains a film of air. The magnetic head is mounted on a support which, as a result of an adequate profile, literally flies on the film of air at a limited distance above the recording layer.

The head is electrically connected to an electronic circuit, which fulfils various functions, such as preamplification, amplification, read-write selection, etc.

In order to reduce the length of the connections between the head and the integrated circuit, as well as for increasing the signal-to-noise ratio and the pass band of the assembly, it has been proposed to combine on the same silicon support, which is appropriately profiled in the form of a support, both the read-write head and the associated electronic circuit. The latter is then produced by conventional methods used in semiconductor technology.

Such an integrated device is for example described in an article by J. W. BECK et al, published in the IBM TECHNICAL DISCLOSURE BULLETIN, Vol. 22, No. 1, June 1979, as well as in the Japanese Patent Abstract published in PATENTS ABSTRACTS OF JAPAN, Vol. 7, No. 228 (P-228), of 8.10.1983, corresponding to Japanese Patent Application JP-A-58 118 016 (SUWA SEIKOSHA K.K) of 13.7.1983.

FIG. 1 diagrammatically shows a device according to this prior art. A silicon support 1 contains rails 2 etched on the surface A constituting the flight or displacement surface. Read-write heads 3 are deposited on a transverse face B of the support. An integrated circuit 4 is formed on said same face B and in connected to the heads. The integrated circuit can be obtained by diffusion in the silicon. The electrical connections with the outside use contact elements 5 connected to conductor 6.

Although satisfactory from certain respects, such a device suffers from disadvantages. Thus, in order to produce the same, it is necessary to start with a silicon block, on whose face B are deposited integrated circuits and read-write heads. This block must then be cut in accordance with planes perpendicular to face B. The flight or displacement face A is then formed by etching. Thus, in the prior art, it is necessary to use very thick silicon blocks (4 to 5 mm) and the block must be worked on two rectangular faces, which requires complex equipment.

SUMMARY OF THE INVENTION

The object of the present invention is to obviate this disadvantage. It therefore recommends a device, whose structure is such that it is possible to use standard, very thin silicon wafers, such as those used in integrated semiconductor circuits and it is merely necessary to work this wafer on a single face type. Therefore, the cost of the device obtained is considerably reduced.

This objective is achieved by a device in which the silicon wafer has two parallel faces, which are crystal planes of orientation 100, one of these faces constituting a flight or displacement plane and in which the magnetic head has a horizontal structure, being arranged on the displacement plane the integrated circuit also being located on one of the faces of orientation 100.

It is pointed out that the use of an orientation 100 crystal face of a silicon wafer as the displacement plane of a support is known per se. For example, such an arrangement is described in the Japanese Patent Abstract published in PATENTS ABSTRACTS OF JAPAN, Vol. 1, No. 103, 13.9.1977, p. 3310 E 77 corresponding to Japanese Patent Application JP-A-52 36016 (HITACHI SEISAKUSHO K.K.) of 19.3.1977.

However, this arrangement is not combined with the use of magnetic heads and an integrated circuit on said same face 100. In the cited document, the magnetic heads are arranged on a lateral face of the support (which corresponds to face B in FIG. 1) and there is no question of integrating with the support an integrated circuit (which would necessarily also be arranged on said same face B).

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 2:
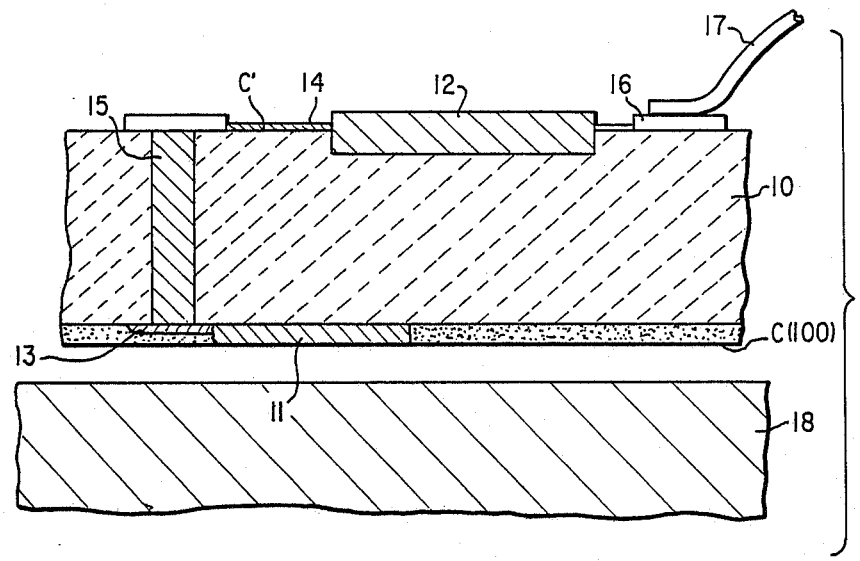
FIG. 2, in section, a device according to the invention.

The device shown in FIG. 2 comprises a silicon wafer 10 having two faces C and C' of crystal orientation 100. A magnetic read-write head 11 is arranged on face C. Face C' carries an integrated circuit 12. Head 11 has input-output connections 13 and circuit 12 has connections 14. These connections are interconnected by a connection 15, which completely traverses the silicon wafer in accordance with a technology currently encountered in multilayer structures. These connections can in particular be produced in the form of thin conductive coatings. The integrated circuit also comprises one or more output contact elements 16 connected to connecting wires 17. The assembly is placed in front of a recording support 18. Face C of wafer 10 thus constitutes the flight or displacement plane of the support. This face can be etched in accordance with a random profile (rails, grooves, catamaran, etc).

Naturally, it would not fall outside the scope of the invention to arrange the integrated circuit 12 on face C alongside the head. In this case, the connections would be on the same face C and the connections of the integrated circuit with the outside represents a channel traversing the silicon plate.

Thus, the following stages are involved in producing such as device:

forming on face 100 of a silicon wafer, amplifier integrated read and/or write circuits by diffusion processes, formation of read and write heads with a horizontal structure on the same face or on the opposite face, formation of the necessary interconnections between a read and write head and the associated integrated circuit, formation of flight or displacement profiles on the face carrying the read-write heads, cutting the various supports and assembling each support on a fixing spring.

Figure 1:
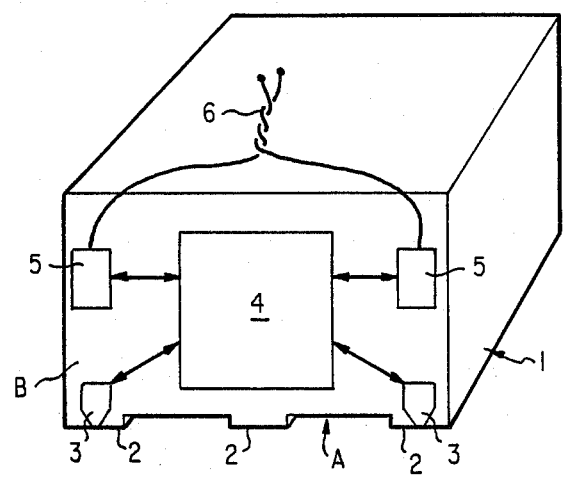
FIG. 1, already described, a prior art device.

The magnetic read and write head, which, according to the invention, is located on the displacement plane, must therefore have a horizontal structure, which is the opposite to that of the heads used in devices such as that of FIG. 1, where the structure is vertical. This means that the coil used for producing a magnetic induction or for forming a voltage from the variation of a magnetic flux must be arranged in a plane parallel to the displacement plane. The main stages of a possible production process for such a head are illustrated in FIGS. 3 to 6.

Figure 3:
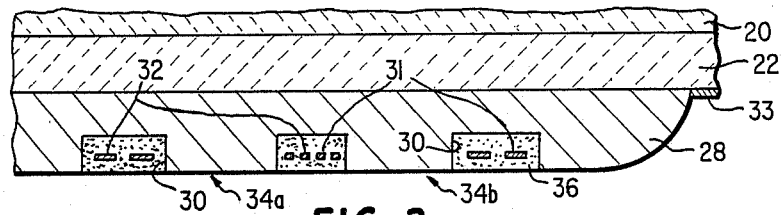
FIGS. 3 to 6 a process for producing a magnetic read-write head on face 100 of a silicon wafer.

FIG. 3 firstly shows a silicon wafer 20 with a silica coating 22 and a magnetic coating 28. In the latter is etched a channel 20 in the form of a figure of eight, which leaves free two pole pieces 34a, 34b. A double spiral coil 31, 32 is formed in the channel and surrounds the two pole pieces 34a, 34b. The channel 30 is then filled with insulant 36. The output connections of the coil are formed by conductors 33.

Figure 4:
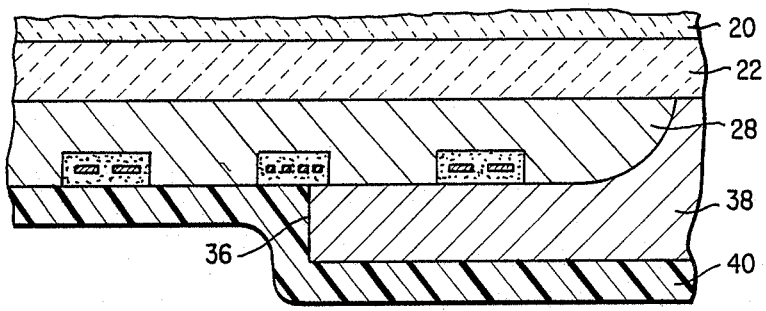
Figure 5:
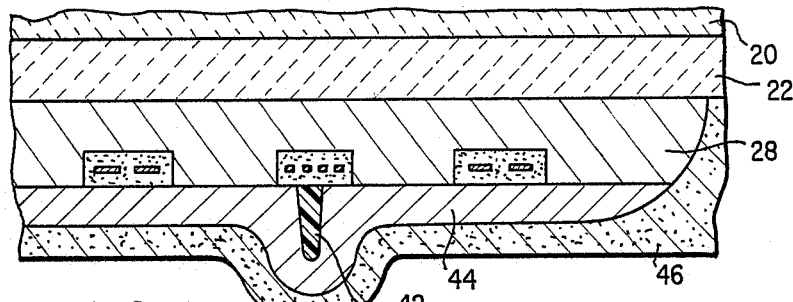
Figure 6:
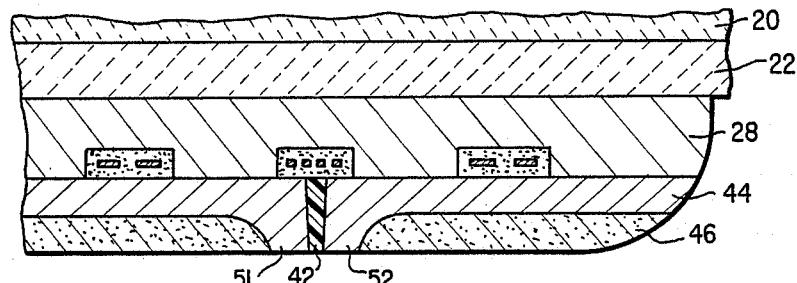

This is followed by the deposition of a resin layer on the assembly and this is etched to form a step 38 (FIG. 4). This step has a side 36 located between the pole pieces. A layer of an non-magnetic material 40 is then deposited on the assembly. This non-magnetic layer is removed, except on side 36, which leaves behind a vertical wall 42 (FIG. 5). This is followed by the deposition of a further magnetic coating 44, which is identical to coating 28 and a protective coating 46. These two coatings form a boss on wall 42.

This structure is then divided off in layer 46, so that two read-write pole pieces 51, 52 separated by the non-magnetic wall 42 appear. The horizontal head is then formed.

What is claimed is:

1. A head slider configuration for magnetic recording on a recording media, comprising:

a silicon wafer having a first face which is designed and arranged so that said first face is parallel to said recording media, and a second opposite face parallel to said first face wherein said first and second faces are each crystal planes of orientation 100;

a flat magnetic head including a planar structure integrated within the first face of said silicon wafer and defining a linear media facing surface;

an electronic circuit integrated in said silicon wafer on said second face; and electrical connection means for connecting said magnetic head and said circuit wherein said electrical connection means passes through said silicon wafer from said first face to said second face.

* * * * *

UNITED STATES PATENT AND TRADEMARK OFFICE
CERTIFICATE OF CORRECTION

PATENT NO. : 4,809,103
DATED : Feb. 28, 1989
INVENTOR(S) : Jean-Pierre LAZZARI

It is certified that error appears in the above-identified patent and that said Letters Patent is hereby corrected as shown below:

--[73] Assignee: Commissariat a l'Energie Atomique, Paris, France--

Signed and Sealed this

Thirty-first Day of October, 1989

*Attest:*

DONALD J. QUIGG

*Attesting Officer*  *Commissioner of Patents and Trademarks*